(12) United States Patent
Wallar et al.

(10) Patent No.: US 6,410,470 B1
(45) Date of Patent: Jun. 25, 2002

(54) THERMAL SPRAY POWDER PROCESS

(75) Inventors: Howard Wallar, Worcester; Robert F. Quinlivan, Rutland; Sung H. Yu, Worcester, all of MA (US)

(73) Assignee: Saint-Gobain Industrial Ceramics, Inc., Worcester, MA (US)

( * ) Notice: Subject to any disclaimer, the term of this patent is extended or adjusted under 35 U.S.C. 154(b) by 0 days.

(21) Appl. No.: 09/556,324

(22) Filed: Apr. 24, 2000

(51) Int. Cl.[7] .................................................. C04B 35/12
(52) U.S. Cl. ........................ 501/126; 423/607; 264/117; 23/313 R
(58) Field of Search ........................... 501/126; 423/607, 423/606; 264/109, 117, 114; 23/313 R (56) References Cited

U.S. PATENT DOCUMENTS

| 4,330,513 A | * | 5/1982 | Hunter et al. |
| 4,720,419 A | * | 1/1988 | Cairns et al. |
| 5,174,976 A | * | 12/1992 | Chu et al. |
| 5,215,727 A | * | 6/1993 | Zeller, III et al. |
| 5,305,726 A | * | 4/1994 | Scharman et al. |
| 5,395,601 A | * | 3/1995 | Situ et al. |
| 5,397,657 A | * | 3/1995 | Ito et al. |
| 5,411,767 A | * | 5/1995 | Soma et al. |
| 5,653,948 A | * | 8/1997 | Kato et al. |
| 5,916,536 A | * | 6/1999 | Deville et al. |
| 6,200,541 B1 | * | 3/2001 | Kleefisch et al. |
| 6,228,801 B1 | * | 5/2001 | Hums et al. |

FOREIGN PATENT DOCUMENTS

| JP | 62167219 | * | 7/1987 |
| JP | 63318252 | * | 12/1988 |
| JP | 05025606 | * | 2/1993 |

* cited by examiner

*Primary Examiner*—Tom Dunn
*Assistant Examiner*—Colleen P. Cooke
(74) *Attorney, Agent, or Firm*—David Bennett (57) ABSTRACT

It is found that calcining chromium oxide powders having a particle size component smaller than 10 microns reduces the volume proportion of smaller particles and increases the general uniformity of particle sizes in the distribution and the roundness of the particles.

13 Claims, 5 Drawing Sheets

THERMAL SPRAY POWDER PROCESS

BACKGROUND OF THE INVENTION

The present invention relates to thermal spray powders and specifically to chromium oxide thermal spray powders.

It is known in the art that it is highly advantageous to apply a fine coating of a ceramic metal oxide to substrates that are, in use, subjected to high temperatures or to highly abrasive or corrosive environments so as to protect the surface of the metal from wear damage or physical deterioration. These coatings can be applied in a variety of ways but among the more frequently used are oxygen fuel guns such as the detonation gun, (the "D-Gun"), manufactured and sold by Praxair; and high-velocity oxygen fuel ("HVOF") guns such as those manufactured and sold by Sulzer-Metco, Praxair, TAFA and plasma guns manufactured by SNMI, Sulzer-Metco, Praxair, TAFA and others. In using all such devices, control of the particle size and shape as well as purity are extremely important.

The size parameter is particularly important since a uniform coating is required and because the systems often have trouble handling widely different particle sizes in the same feed. Generally thermal spray powders have particle sizes from 5 to 125 microns but any particular powder used will have a rather narrow particle size variation within this broad range. Thus most applications call for graded sizes such as 5–25, 10–30, 10–38, 15–45, 22–45, 10–63, 45–75, 45–125 and so on. In such graded sizes fines are avoided as far as possible with a fines tolerance usually being specified at no more than 2 to 5% below the bottom limit. Wherever possible particle sizes below 5 microns are removed to increase productivity.

This narrow size distribution is important to optimize melting and delivery of material to the gun at a uniform rate. Fine particles tend to hamper flow and/or cause nozzle build-up during application. They also tend to cause irregular flow and to stick to the surface of larger particles. All this results in uneven coating and build-up rate and when this is detected the process must be shut down and corrective measures taken. If it is not detected a defect, such as the deposition of agglomerates of fine particles, can result in pinholes, large pores or defects which in turn can lead to coating failure or, if detected, require re-working. Thus a narrow particle size range with a minimum of associated fines is critical in providing a high quality thermal spray powder.

The shape of thermal spray powders is also important in their effective and economic use. Rounded shapes are best with blocky shapes also being quite acceptable. However shapes that are weak, that is having a distinct aspect ratio, (the ratio of the longest particle dimension to the next longest dimension perpendicular to the longest), of about 2 or more, can cause severe flow problems and therefore irregular coatings.

In summary the ideal powder for thermal spray applications is round and falls within a narrow size range and has a minimum of fines outside that range. The chemical nature of the powder is determined by the application for which it is intended. Where such application is intended to impart wear resistance, strength, corrosion resistance and suitability for laser engraving for example, the powder of choice is chromium oxide. Such powders have their own specific problem in such applications since they are often contaminated by chromium metal which must be reduced to a minimum, usually below 0.1% by weight, before they can be used.

Chromium oxide is typically produced in a fusion process in an electric arc furnace using a feed of fine pigment-grade chromium oxide with a particle size of about 3 microns. The fusion process causes the particles to melt and fuse into an ingot that is then crushed to the appropriate particle sizes. The arc furnace however, which uses carbon electrodes, operates under somewhat reducing conditions leaving a significant amount of chromium metal as an impurity. This can be reduced to acceptable levels by subsequent calcination under oxidizing conditions. In this process the ingot of fused chromium oxide is milled to produce a fine powder which is then size-classified and the desired particle size range is heated in a furnace at temperatures above about 1100° C. in a flow of air. Any resulting agglomeration can readily be broken down to the ultimate particles again by a light milling.

The fusion process is somewhat expensive and results in the loss of the considerable amount of fines, material that is typically removed prior to calcination. These fines are often recycled through the fusion process or otherwise disposed of.

A process for making an improved chromium oxide thermal spray powder has now been devised that is more economical, results in particles with a better shape and involves less unusable by-product. In addition the process has an added degree of flexibility in making surface chemistry adjustments in the particles and therefore the coating applied.

SUMMARY OF THE INVENTION

The present invention provides a process for the production of a chromium oxide thermal spray powder which comprises calcining chromium oxide powder with particle size range of 0.1 to 125 microns and comprising at least 5% by volume of chromium oxide particles smaller than 10 microns for a time sufficient to reduce the volume of particles with sizes less than 10 microns to below 5%, and preferably below 2%, of the total weight of chromium oxide.

As indicated above chromium oxide particles are usually made by fusing pure chromium oxide in an electric arc furnace. This is because the fine particles, which are too fine to use directly in thermal spray applications, do not readily sinter together. Rather the surface material tends to volatilize and then condense. This explains the previous commercial practice of fusing, crushing and fines segregation as discussed above..

A preferred process therefore comprises:
a) feeding chromium oxide particles with sizes of from 0.1 to 125 microns into a furnace along with from 0 to 100% based on the weight of the comminuted product, of chromium oxide powder with a particle size less than 10 microns to produce a mixture of particles in which at least 5% by volume of the particles are smaller than 10 microns;
b) calcining the mixture at a temperature above 1000° C. for a time sufficient to cause reduction of the content of chromium oxide particles smaller than 10 microns to below 5%; and
c) cooling and classifying the resultant product.

Where the mixture comprises chromium metal, it is preferred that the calcining operation be carried out in an air flow to cause oxidation of the metal to the oxide.

In a further preferred aspect of the invention the initial charge of chromium oxide is obtained by a fusion process producing a block of chromium oxide followed by a comminution of the block until the particle size is below 125 microns. This process has the advantage that the powder obtained by crushing the fused chromium oxide does not need to be classified to remove fines before calcination and, by using the fine powder feedstock used to make the fused chromium oxide powder, the process throughput in greatly increased. At the same time the fines produced by the comminution and the new fine powder added are used to improve the shape of the chromium oxide particles and render them closer to the spherical. This is apparently achieve by volatilization of the fine particles and preferred recondensation of the volatilizate on the larger particles in areas of concavity, thus improving their shapes for thermal spray purposes by making them more spherical. There seems to be a particle size at about 5 microns or larger where particles become sites for condensation or crystal growth. Particles that are less than 5 microns vaporize and then are absorbed or crystallize on the surface of particles that are larger than 5 microns.

Using the fused particles as sites allows the reaction with fine particles to take place at relatively low temperatures above 1100° C. and preferred at 1350° C. The reaction will also take place when using 100% of particles less than 10 microns providing a protracted time at low temperatures or increased temperature is used. With increased temperature in the range of 1600C., product of 5 to 125 microns from feeds <10 microns can be made in reasonable times without the need for larger fused particles as sites for growth.

It is understood that when reference is made herein to "particle sizes", these are volume average particle sizes measured using a Leeds & Northrop "Microtrac" particle size analyzer which employs a laser light scattering technique to measure the sizes. When running the Microtrac in "percent passing" mode, it is often convenient to describe the particle size distribution in terms of the volume percentage below a given level. Therefore the "$D_{10}$" value is understood to indicate the size where 10 volume % of the particles are smaller than the value at $D_{10}$; $D_{50}$ indicates the median particle size of the overall sample with equal volumes of particles larger and smaller than the median value; and $D_{90}$ gives the particle size where 90 volume % of the particles are smaller than that size.

DESCRIPTION OF PREFERRED EMBODIMENTS

The invention is now further described with reference to the following Examples which are offered merely to illustrate the invention rather than suggest or imply any inherent limitations on its scope.

In each of the examples the comminuted chromium oxide was obtained by fusing chromium oxide powders with particle sizes primarily below 10 microns in an electric arc furnace with carbon electrodes to form an ingot of chromium oxide which was then comminuted using a rolls crusher. Comminution was continued until the particles had an average size well below 125 microns and the particles with sizes larger than 125 microns were screened out. This process resulted in chromium oxide particles with a total of up to about 5% of chromium metal.

Calcination Process

An electric kiln was used for the calcination process and the chromium oxide feed was held in the kiln at 1350° C. for a period of 15 hours. Ramp up to the calcination temperature took 8 hours and cool down to room temperature after the calcination took about 30 hours. The total amount of chromium oxide fed into the kiln in any specific run was 450 kg. The particle size distribution was measured before and after each run. The Results are shown in Table 1.

Fusion Process

Fusion of fine chromium oxide particles was carried out in a conventional carbon arc fusion furnace operated at a temperature of 2800° C.

EXAMPLE 1

In this Example the results of carrying out the process of the invention on a chromium oxide powder obtained by a milling process and then with the same powder to which pigment grade chromium oxide, ("fines"), has been added. The results are set forth in Table 1 below.

This Table sets out the results of calcining a feed obtained directly from a roller mill crusher without the customary separation of fines. The second evaluation was performed on a separated fines fraction from a roller mill crusher having a $D_{50}$ of about 3 to 5 microns, ("milled fines") with the addition of 10% of pigment grade chromium oxide which also had a $D_{50}$ of about 3 microns, ("fines"). This added material is the same chromium oxide used as the feedstock for the fusion process by which the chromium oxide fed to the roll crusher was made. For each, the initial, or "green", particle size distribution and the "fired" particle size distribution are given.

TABLE 1

| Part. Size | MILLED FEED ALONE | | MILLED FINES + FINES | |
|---|---|---|---|---|
| | GREEN | FIRED | GREEN | FIRED |
| $D_{10}$ | 4.17 | 14.59 | 0.969 | 5.7 |
| $D_{50}$ | 18.76 | 30.09 | 3.69 | 14.76 |
| $D_{90}$ | 41.12 | 50.69 | 13.58 | 33.15 |
| 15.0 microns | 41.7 | 11.91 | 92.49 | 53.21 |
| 11.0 microns | 29.4 | 4.23 | 85.51 | 33.13 |
| 7.78 microns | 21.19 | 1.57 | 77.03 | 18.54 |
| 5.50 microns | 14.59 | 0.48 | 66.29 | 9.16 |
| 3.89 microns | 9.07 | 0.0 | 50.7 | 3.59 |
| 2.75 microns | 6.41 | 0.0 | 48.49 | 2.06 |
| 1.94 microns | 3.86 | 0.0 | 43.20 | 1.14 |
| 1.38 microns | 1.81 | 0.0 | 26.82 | 0.38 |
| 0.92 micron | 0.37 | 0.0 | 10.13 | 0.0 |

The upper portion of the Table gives the $D_{10}$, $D_{50}$ and $D_{90}$ values and the values given in the lower part of the Table indicate the percentage of particles with sizes smaller than the indicated value in the lower part of the left hand column. It will be readily apparent that the particle size distribution has shifted markedly towards the larger particle sizes and the particles below about 5 microns have been virtually eliminated.

Figure 1:
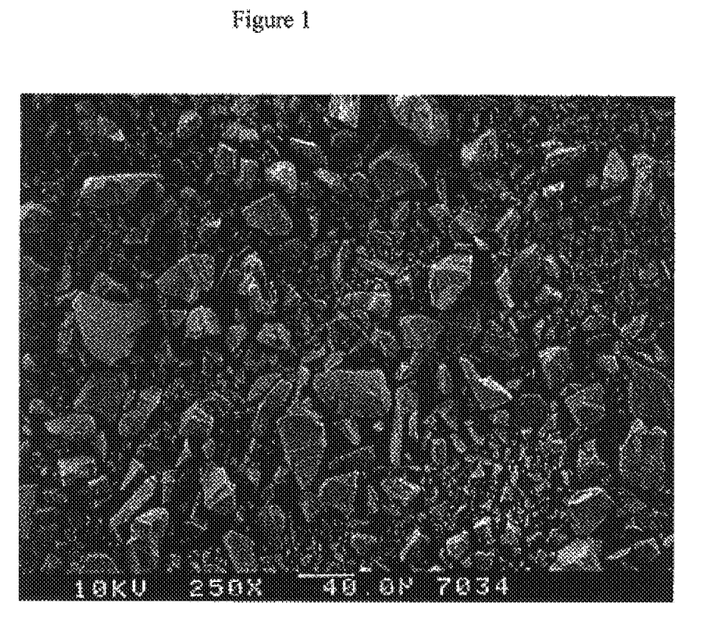
FIG. 1 is an SEM photomicrograph of chromium oxide particles after comminution but before calcination.
Figure 2:
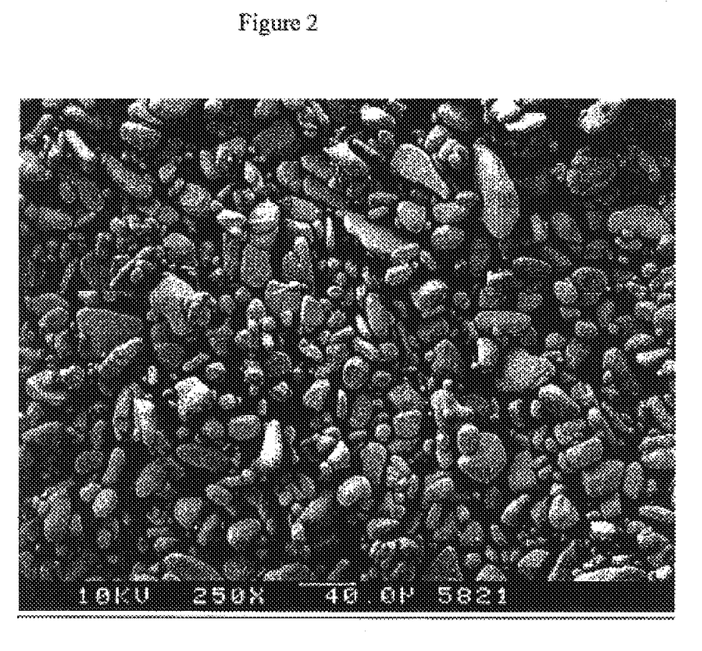
FIG. 2 is an SEM photomicrograph of chromium oxide particles as shown in FIG. 1 after they have been calcined.
Figure 3:
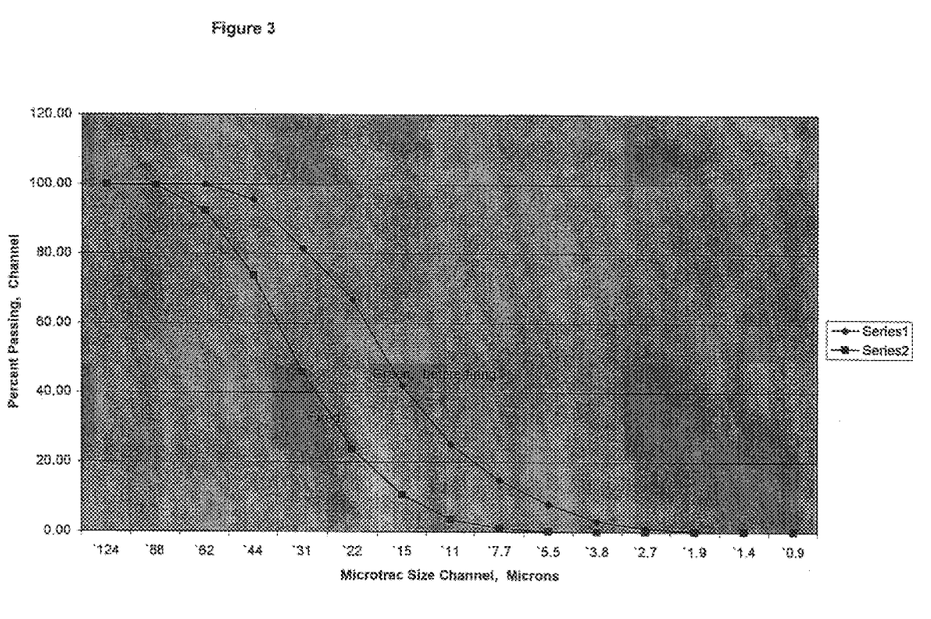
FIG. 3 is a graph showing Microtrac particle sizes before and after calcination as described in Example 1, Table 1, "Milled Feed Alone"

SEM photomicrographs were taken of chromium oxide particles of the milled feed prior to calcination according to the invention and after. These are reproduced as FIGS. 1 and 2. It will readily be seen that the calcination resulted in a considerable change from the angular, sharp-edged appearance of the milled products seen in FIG. 1, (before calcination), to the smoother rounded shapes in FIG. 2, (after calcination).

EXAMPLE 2

The following Example is similar to that set forth in Example 1 with the difference that the two feeds evaluated were based on a classified roller mill product wherein all particles had a particle size less than 50 microns and to which an amount of the same pigment grade chromium oxide as used in Example 1 had been added. The amount added was either 10% or 25% by weight of the milled feed. The results obtained are shown in Table 2.

TABLE 2

| | MILL. FEED + 10% FINES | | MILL. FEED + 25% FINES | |
|---|---|---|---|---|
| Part. Size | GREEN | FIRED | GREEN | FIRED |
| $D_{10}$ | 4.79 | 12.87 | 3.87 | 11.22 |
| $D_{50}$ | 15.54 | 28.79 | 12.32 | 26.47 |
| $D_{90}$ | 37.02 | 51.08 | 34.34 | 48.0 |
| 15.0 microns | 50.07 | 15.70 | 59.37 | 20.0 |
| 11.0 microns | 35.30 | 6.73 | 45.70 | 9.57 |
| 7.78 microns | 23.95 | 3.13 | 33.38 | 4.76 |
| 5.50 microns | 14.15 | 1.16 | 21.30 | 1.81 |
| 3.89 microns | 5.95 | 0.0 | 10.07 | 0.09 |
| 2.75 microns | 3.24 | 0.0 | 5.55 | 0.0 |
| 1.94 microns | 1.96 | 0.0 | 3.28 | 0.0 |
| 1.38 microns | 0.71 | 0.0 | 1.39 | 0.0 |
| 0.92 micron | 0.0 | 0.0 | 0.21 | 0.0 |

Once again the pattern of a shift away from the finer sizes and a significant growth of the population of particles in the size range greater than about 5 microns is very evident.

EXAMPLE 3

The extent to which particle growth and elimination of the smallest particles can be controlled by the length of the calcination process is illustrated in this Example. It should be noted that excessively long calcination can lead to the agglomeration of the larger particles which is also very disadvantageous for a thermal spray powder. This example does not show the length of calcination but does show adding fines at 2 major percentages and the resulting consumption by sites in the firing. Test with 25% fines and 50% fines were done at 1350 and 1400° C.

In Table 3 below, data are presented based on mixtures of two cuts separated from a milled fused chromium oxide: a coarser cut that included all particles passing through a 200 mesh sieve, (and therefore were smaller than 75 microns); and a finer cut which included only particles passing through a 500 mesh sieve, (and therefore were smaller than 18 microns). In the first evaluation 25% by weight of the finer cut was added and in the second, 50% by weight of the finer cut was added. Again the data reveal a significant shift towards particle sizes larger than about 5 microns and a virtual elimination of particles smaller than 5 microns.

TABLE 3

| | 25% FINES | | 50% FINES | |
|---|---|---|---|---|
| Part. Size | GREEN | FIRED | GREEN | FIRED |
| $D_{10}$ | 5.81 | 10.46 | 4.19 | 8.39 |
| $D_{50}$ | 30.09 | 24.32 | 13.0 | 18.83 |
| $D_{90}$ | 66.05 | 48.02 | 64,34 | 39.93 |
| 15.0 microns | 33.33 | 24.74 | 57.22 | 37.95 |
| 11.0 microns | 23.68 | 11.32 | 42.90 | 19.15 |
| 7.78 microns | 15.52 | 4.65 | 29.04 | 8.23 |
| 5.50 microns | 9.05 | 1.38 | 17.57 | 2.62 |
| 3.89 microns | 4.09 | 0.0 | 8.51 | 0.0 |
| 2.75 microns | 2.67 | 0.0 | 6.17 | 0.0 |
| 1.94 microns | 1.74 | 0.0 | 4.77 | 0.0 |
| 1.38 microns | 0.66 | 0.0 | 2.47 | 0.0 |
| 0.92 micron | 0.0 | 0.0 | 0.66 | 0.0 |

EXAMPLE 4

This Example shows the effect on particle size distribution of firing a feed comprising:
100% of a fine pigment grade chromium oxide;
100% of a relatively coarser pigment grade chromium oxide; and
a 50/50 mixture of the two grades.

The results in Table 4 show the possibilities of controlling quite precisely the particle size of the product obtained.

TABLE 4

| | Fine Pigment Only | | Coarse Pigment Only | |
|---|---|---|---|---|
| Part. Size | GREEN | FIRED | GREEN | FIRED |
| $D_{10}$ | 0.94 | 10.66 | 3.20 | 13.36 |
| $D_{50}$ | 1.77 | 25.10 | 6.79 | 31.23 |
| $D_{90}$ | 4.44 | 48.39 | 13.58 | 56.40 |
| 15.0 microns | 99.99 | 23.12 | 94.24 | 14.31 |
| 11.0 microns | 99.85 | 10.74 | 80.72 | 5.95 |
| 7.78 microns | 99.71 | 4.90 | 59.42 | 2.60 |
| 5.50 microns | 97.07 | 1.62 | 35.61 | 0.88 |
| 3.89 microns | 85.09 | 0.0 | 15.67 | 0.0 |
| 2.75 microns | 74.67 | 0.0 | 7.23 | 0.0 |
| 1.94 microns | 56.17 | 0.0 | 2.92 | 0.0 |
| 1.38 microns | 32.81 | 0.0 | 0.94 | 0.0 |
| 0.92 micron | 1.51 | 0.0 | 0.0 | 0.0 |

| | 50/50 Fine & Coarse pigment | |
|---|---|---|
| Part. Size | GREEN | FIRED |
| $D_{10}$ | 1.03 | 11.62 |
| $D_{50}$ | 2.39 | 27.73 |
| $D_{90}$ | 6.41 | 52.31 |
| 15.0 microns | 99.59 | 19.20 |
| 11.0 microns | 97.58 | 18.75 |
| 7.78 microns | 93.79 | 4.01 |
| 5.50 microns | 85.32 | 1.42 |
| 3.89 microns | 68.31 | 0.0 |
| 2.75 microns | 55.95 | 0.0 |
| 1.94 microns | 40.30 | 0.0 |
| 1.38 microns | 22.92 | 0.0 |
| 0.92 micron | 7.76 | 0.0 |

Examples 5–7 illustrate variations in the site materials. Adding pigment grade chromium oxide to alumina, zirconia, spinel, chromium oxide and many other site particles can make a layered chemistry particle where the core is the site particle and chromium oxide is the outer layer. Other chemistries like alumina or spinel or zirconia or iron oxide can be added to the fine chromium oxide for an infinitely variable surface chemistry product. In addition the core particle can be changed for more variation in chemistry. Thus for example it is possible to use the above approach to produce particles with an alumina or zirconia core and a chromium oxide outer layer, or a chromium oxide core and a chromium oxide outer layer, or a chromium oxide core with an alumina/chromium oxide outer layer and many others. The particles formed in this way are similar to the previous examples where the positive pressure developed from chromium oxide helps to keep the particles distinct. With most other materials sintering takes place as the positive pressure is not present; a solid block would form if for example all fine alumina was used. Using alumina as a core and chromium oxide as an outer layer forms distinct particles. You can think of the chromium oxide component of the outer layers as a parting agent, that maintains distinct particles in the process which would normally sinter to a block.

EXAMPLE 5

Figure 4:
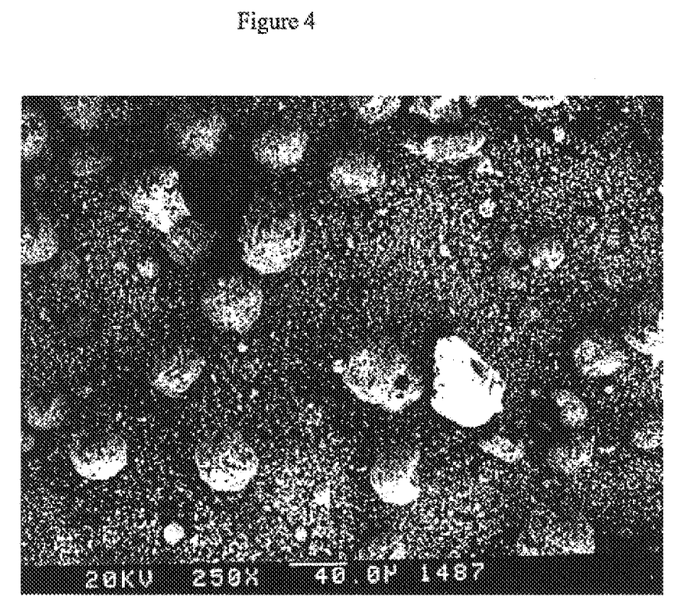
FIGS. 4 and 5 are, respectively, pre-and post-calcination SEM photomicrographs of the products made according to Example 6.
Figure 5:
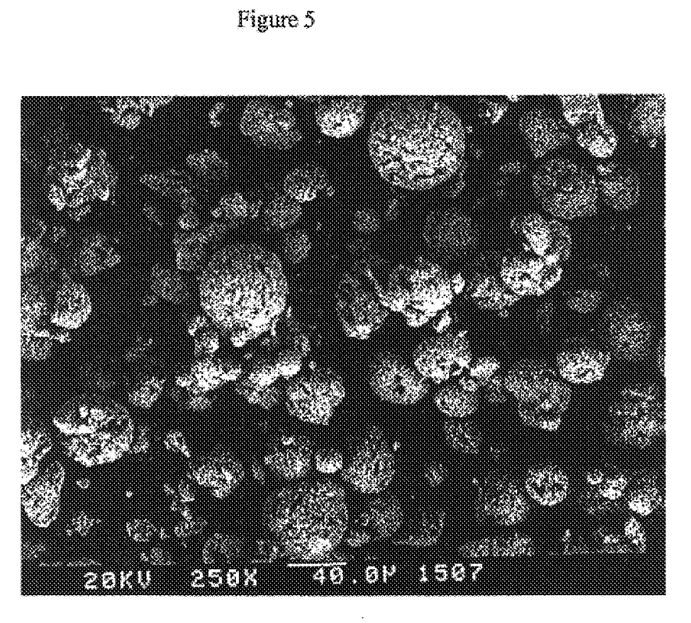

This example shows the use of a spinel particle as the core or site material representing 50% of the mix with 50% chromium oxide fines added. FIGS. 4 and 5 are photomicrographs of the pre-and post-calcination products. The particles size distributions are shown in the following Table.

|  | 50/50 Spinel + pigment 50/50 | |
| --- | --- | --- |
| Part. Size | GREEN | FIRED |
| $D_{10}$ | 1.03 | 20.20 |
| $D_{50}$ | 3.90 | 45.04 |
| $D_{90}$ | 17.20 | 76.93 |
| 15.0 microns | 31.87 | 5.65 |
| 11.0 microns | 31.21 | 1.81 |
| 7.78 microns | 28.88 | 0.67 |
| 5.50 microns | 27.86 | 0.260 |
| 3.89 microns | 26.89 | 0 |
| 2.75 microns | 21.95 | 0 |
| 1.94 microns | 12.85 | 0 |
| 1.38 microns | 6.83 | 0 |
| 0.92 micron | 2.15 | 0 |

EXAMPLE 6

Figure 6:
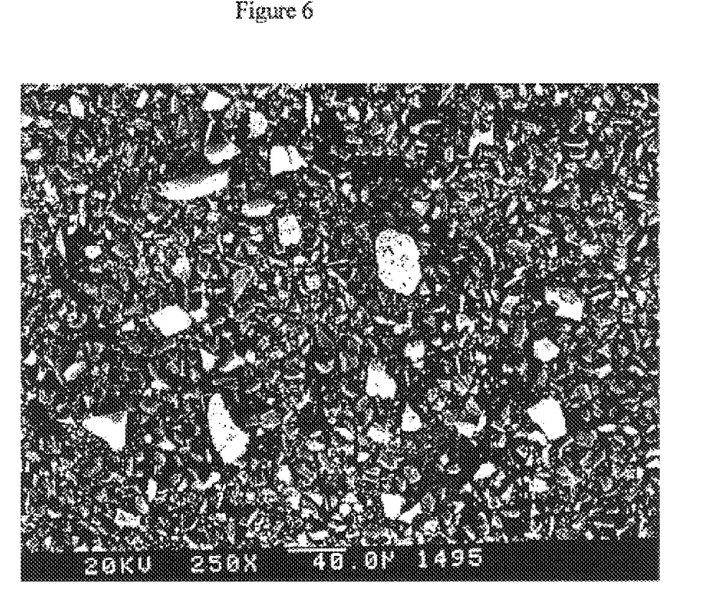
FIGS. 6 and 7 are, respectively, pre-and post-calcination SEM photomicrographs of the products made according to Example 7.
Figure 7:
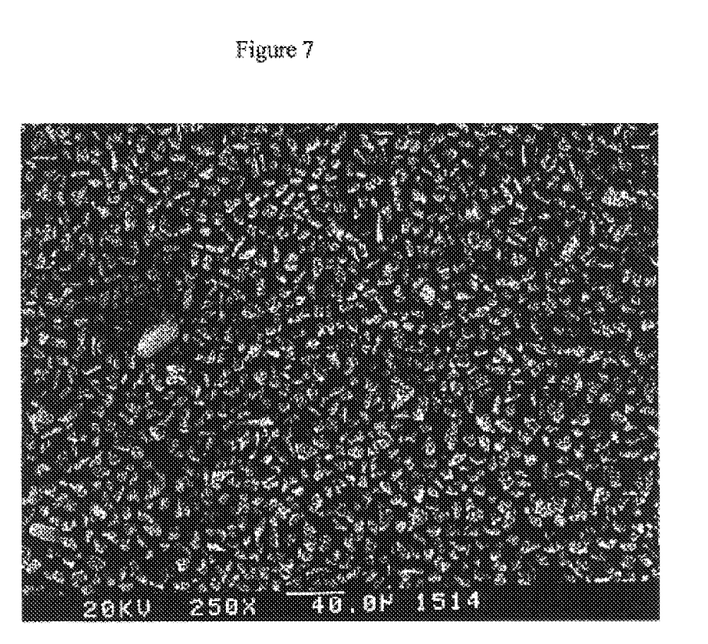

In this Example an alumina core particle is treated to give it a coating of chromia. The particle size distribution before and after calcination is given in the following Table. SEM photomicrographs of the before and after products are shown in FIGS. 6 and 7.

|  | 50/50 Alumina + Chromium Oxide Pigment | |
| --- | --- | --- |
| Part. Size | GREEN | FIRED |
| $D_{10}$ | 1.20 | 20.20 |
| $D_{50}$ | 6.43 | 45.04 |
| $D_{90}$ | 15.29 | 76.93 |
| 15.0 microns | 90.56 | 79.85 |
| 11.0 microns | 76.71 | 48.71 |
| 7.78 microns | 58.84 | 19.48 |
| 5.50 microns | 43.44 | 5.87 |
| 3.89 microns | 32.12 | 2.57 |
| 2.75 microns | 29.36 | 2.57 |
| 1.94 microns | 23.55 | 1.56 |
| 1.38 microns | 13.90 | 0.50 |
| 0.92 micron | 2.15 | 0 |

EXAMPLE 8

In this Example core particles comprising 6% Yttria-69% zirconia-25% alumina are treated to give a coating of chromia. The particle size distribution before and after calcination is given in the following Table. The core particles represented 50% by weight and chromium oxide pigment provided the balance of the weight.

Figure 8:
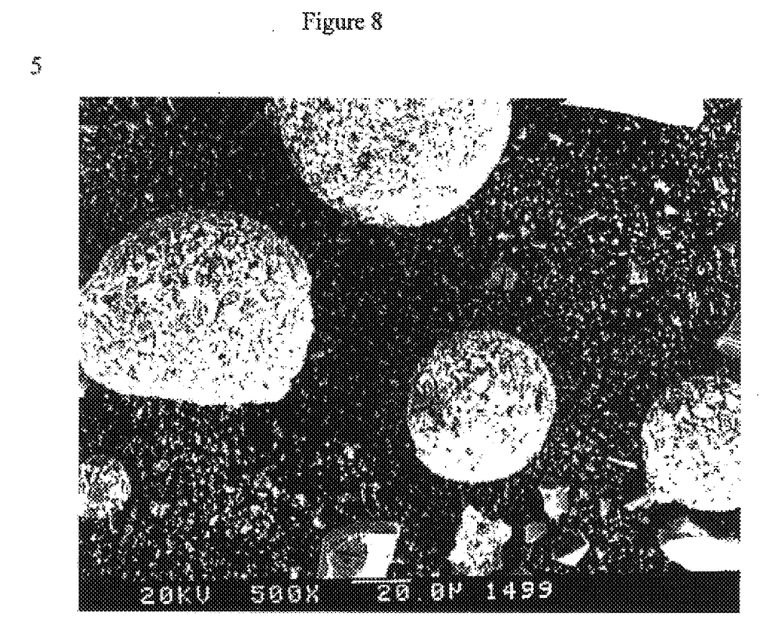
FIGS. 8 and 9 are, respectively, pre-and post-calcination SEM photomicrogaphs of the products made according to Example 8.
Figure 9:
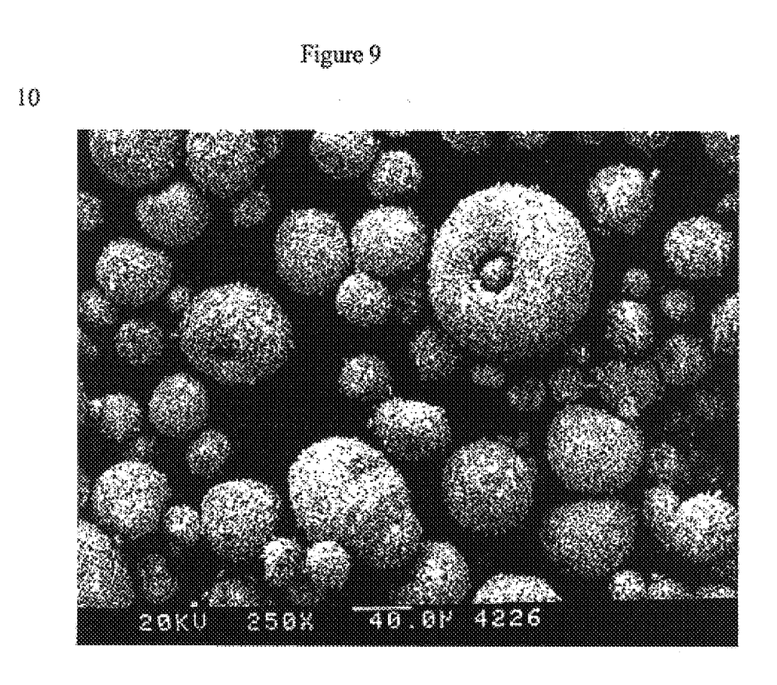

The particle size distribution before and after calcination is shown in the following Table and SEM photomicrographs present the same information visually in FIGS. 8 and 9.

|  | 50/50 YZA + Chromium Oxide Pigment | |
| --- | --- | --- |
| Part. Size | GREEN | FIRED |
| $D_{10}$ | 2.70 | 18.21 |
| $D_{50}$ | 61.37 | 58.28 |
| $D_{90}$ | 326.58 | 103.8 |
| 15.0 microns | 15.81 | 7.64 |
| 11.0 microns | 14.79 | 3.79 |
| 7.78 microns | 14.79 | 1.92 |
| 5.50 microns | 14.75 | 0.79 |
| 3.89 microns | 12.65 | 0 |
| 2.75 microns | 10.20 | 0 |
| 1.94 microns | 6.02 | 0 |
| 1.38 microns | 3.09 | 0 |
| 0.92 micron | 0.84 | 0 |

What is claimed is:

1. A process for the production of a chromium oxide thermal spray powder which comprises calcining a ceramic powder with a particle size of less than 125 microns and comprising at least 5% by volume of chromium oxide particles smaller than 5 microns said calcining continuing for a time sufficient to reduce the volume of particles with sizes less than 5 microns to below 5%.

2. A process according to claim 1 in which calcination is continued until the percentage of particle with sizes less than 5 microns is less than 2%.

3. A process according to claim 1 in which the calcination is conducted at a temperature between 1000 and 1600° C.

4. A process according to claim 3 in which the calcination is conducted at a temperature between 1200 and 1400° C.

5. A process according to claim 1 in which the powder calcined has a $D_{90}$ of at least 30 microns before calcination.

6. A process according to claim 1 in which the powder calcined has a $D_{10}$ below 5 microns and essentially all particles in this fraction are chromium oxide particles.

7. A process according to claim 1 which comprises selecting for calcination a ceramic powder of which at least a portion is obtained by crushing a chromium oxide obtained by a fusion process.

8. A process according to claim 1 in which the ceramic powder consists of a chromium oxide powder with a $D_{50}$ below 10 microns is used and is calcined at 1600° C. to obtain a powder with particles within a size range of from 5–125 microns and a $D_{50}$ greater than 10 microns.

9. A process according to claim 1 in which the ceramic powder comprises particles selected from the group consisting of alumina, zirconia, spinel and chromium oxide.

10. A process for the production of a thermal spray powder which comprises:
   a) feeding ceramic oxide particles with a size range of 125 microns and less into a furnace along with from 5 to 90% based on the total weight of chromium oxide powder with a particle size less than 10 microns to produce a mixture of particles in which at least 10% by volume of the particles are smaller than 10 microns;
   b) calcining the mixture at a temperature above 1000° C. for a time sufficient to cause reduction of the content of chromium oxide particle smaller than 10 microns to below 5%; and
   c) cooling and classifying the resultant product.

11. A process according to claim 10 in which the ceramic oxide particles are selected from ceramic oxides that adhere to chromium oxide.

12. A process according to claim 11 in which the ceramic oxide particles are selected from the group consisting of alumina, zirconia, spinel and chromium oxide.

13. A process according to claim 10 in which the ceramic oxide particles consist of chromium oxide.

\* \* \* \* \*